July 2, 1963

C. F. JOHNSON 3,095,627

PIPE ANCHOR

Original Filed May 14, 1954

Charles F. Johnson
INVENTOR.

BY Murray Robinson
ATTORNEY

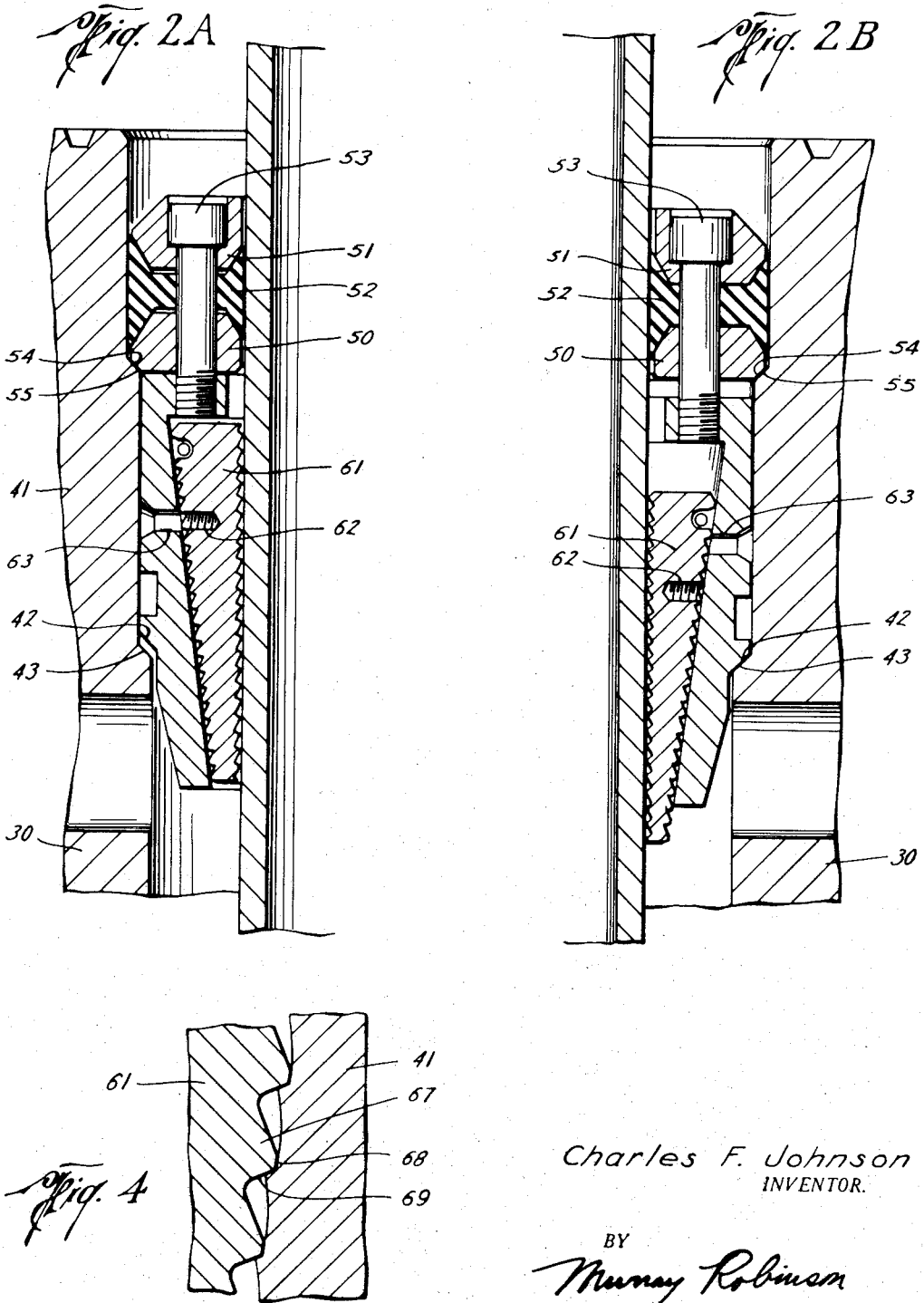

July 2, 1963
C. F. JOHNSON
3,095,627
PIPE ANCHOR
Original Filed May 14, 1954
11 Sheets-Sheet 3
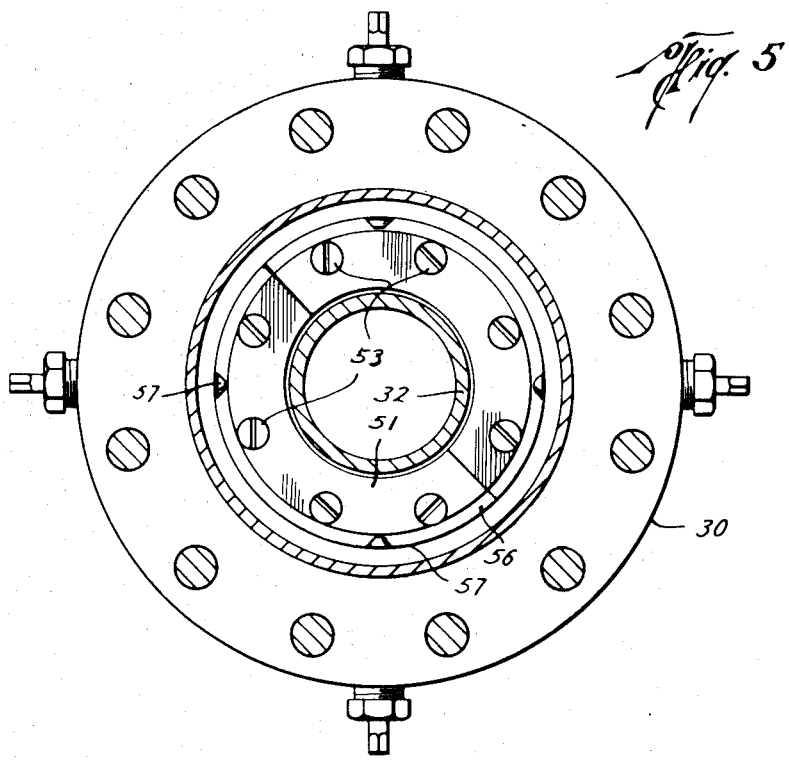
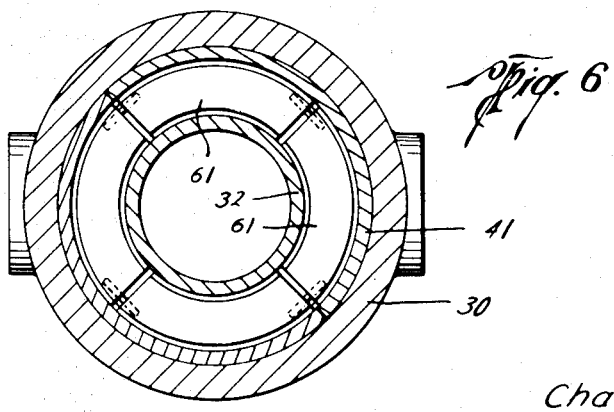
Charles F. Johnson
INVENTOR.
BY Murray Robinson
ATTORNEY July 2, 1963  C. F. JOHNSON  3,095,627
PIPE ANCHOR
Original Filed May 14, 1954  11 Sheets-Sheet 4
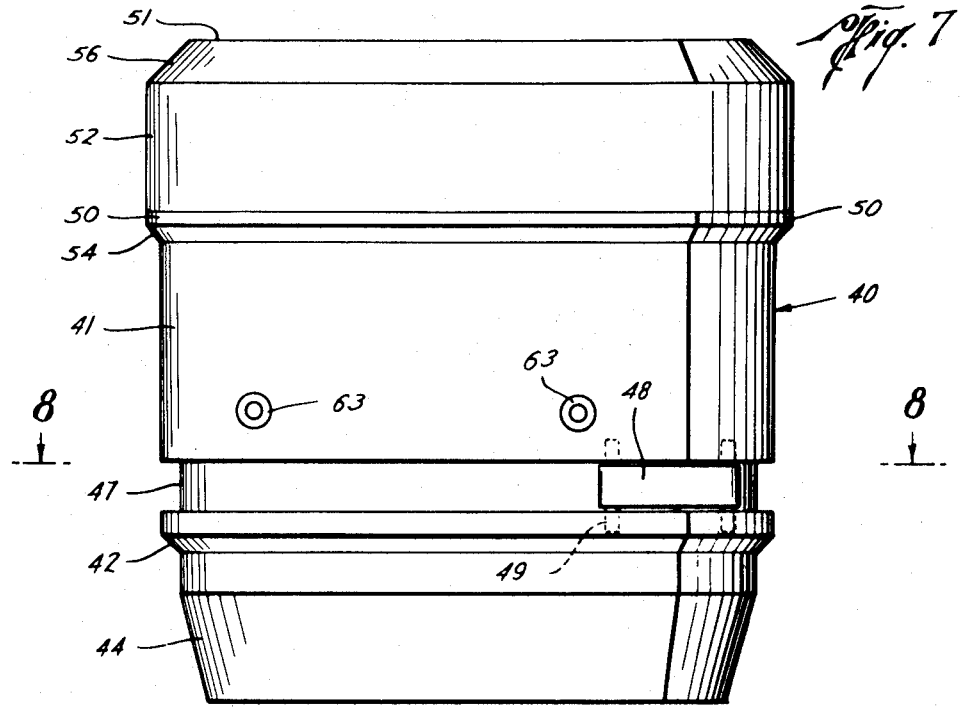
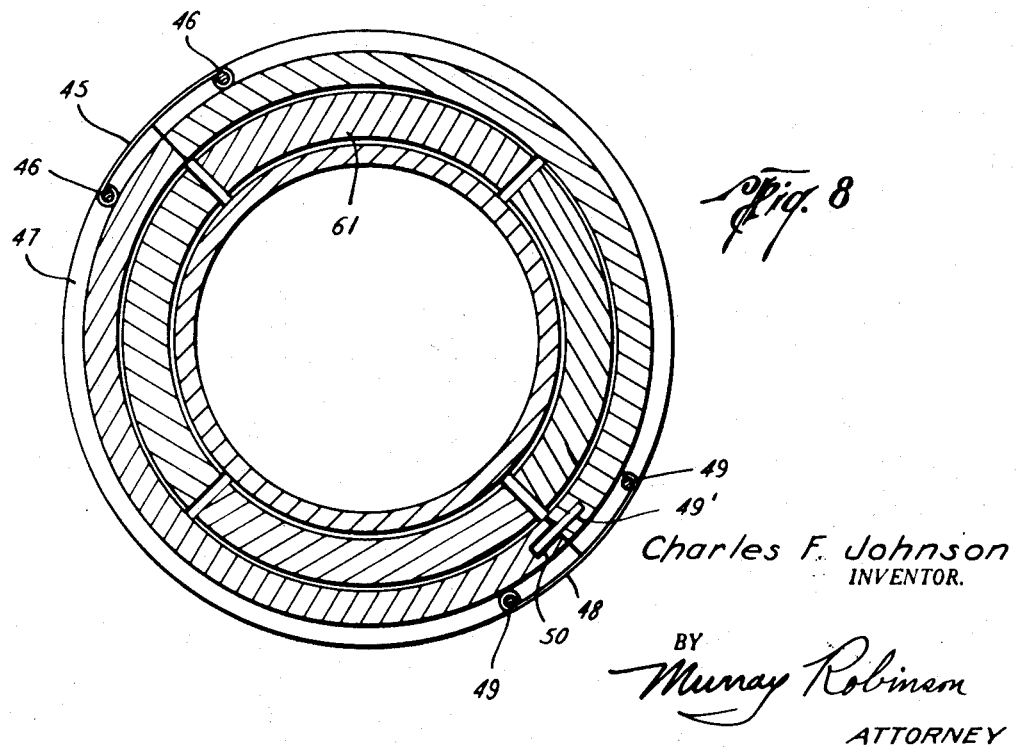
Charles F. Johnson
INVENTOR.
BY Murray Robinson
ATTORNEY July 2, 1963   C. F. JOHNSON   3,095,627
PIPE ANCHOR Original Filed May 14, 1954   11 Sheets-Sheet 5

Charles F. Johnson
INVENTOR.

BY Murray Robinson
ATTORNEY

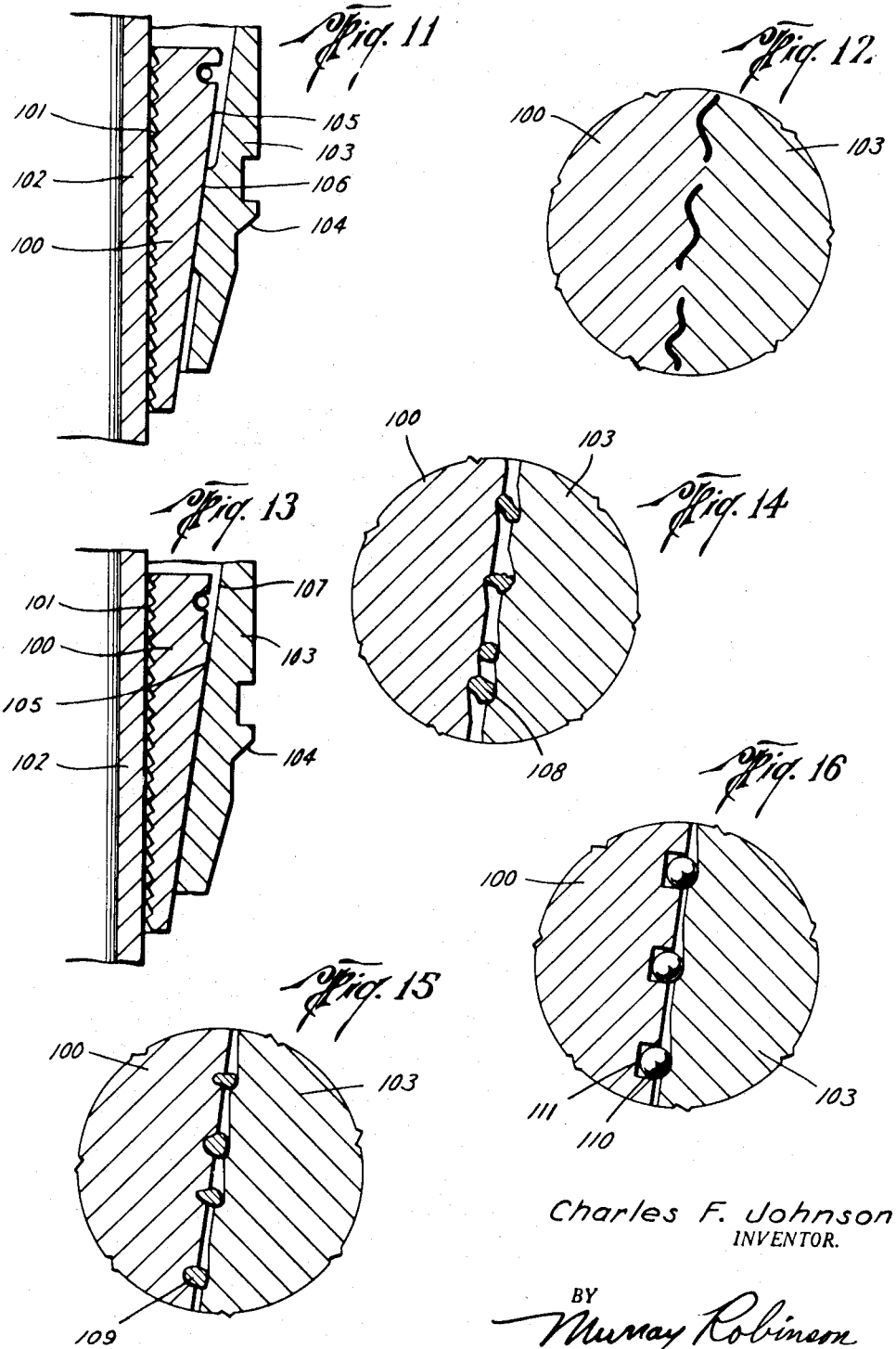

July 2, 1963  C. F. JOHNSON  3,095,627
PIPE ANCHOR
Original Filed May 14, 1954  11 Sheets-Sheet 7
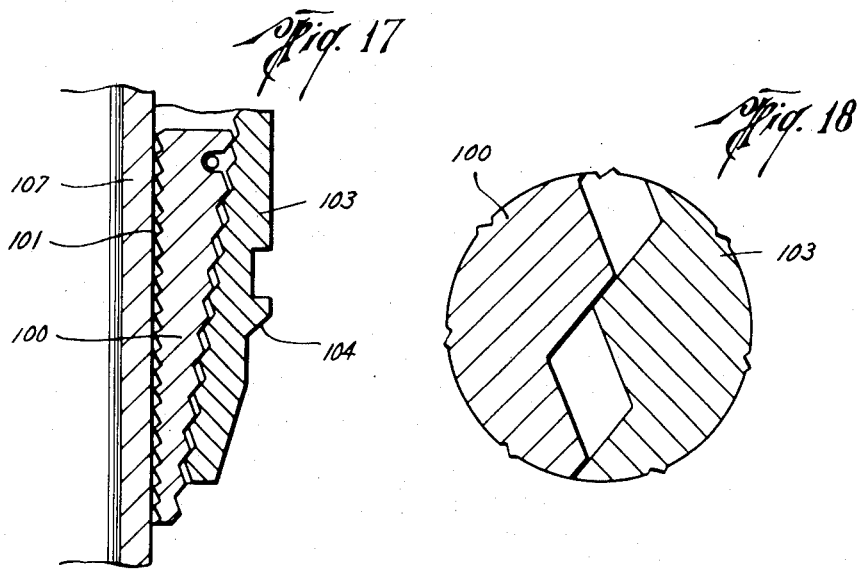
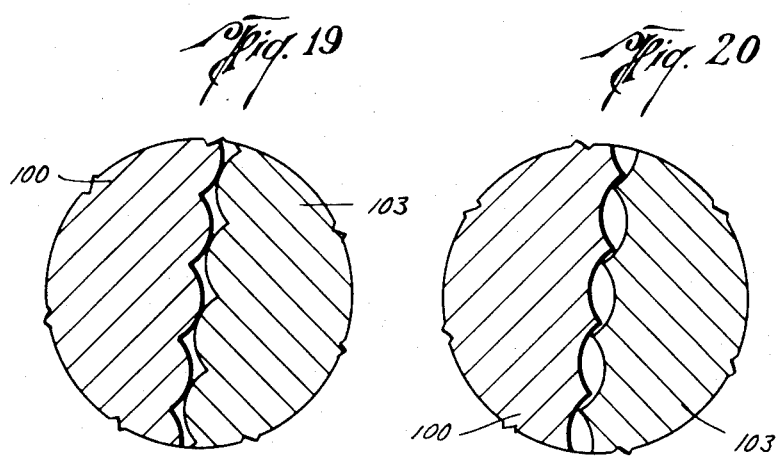
Charles F. Johnson
INVENTOR.
BY Murray Robinson
ATTORNEY

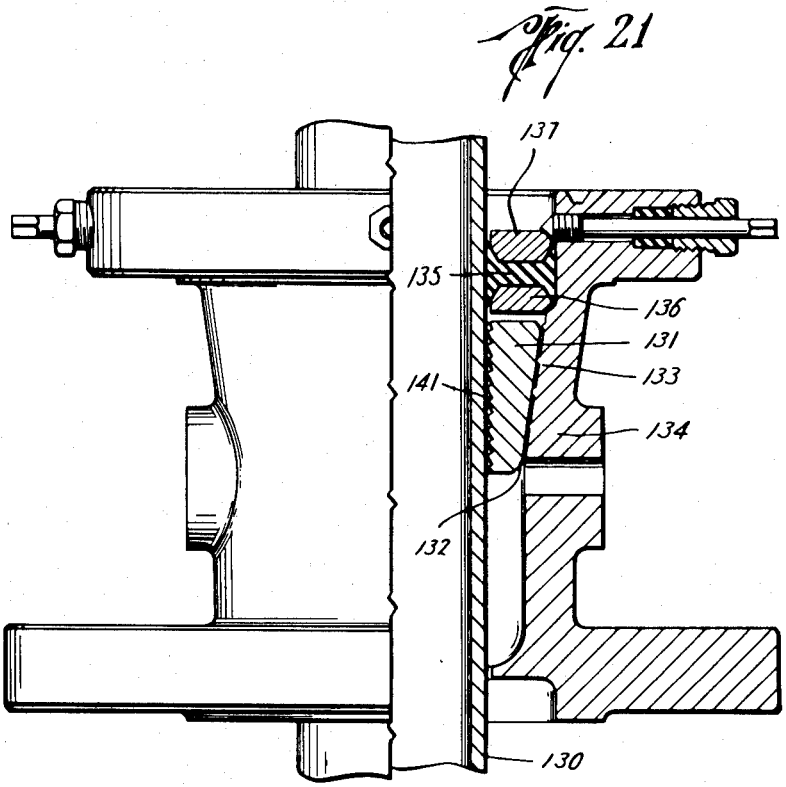
Fig. 21
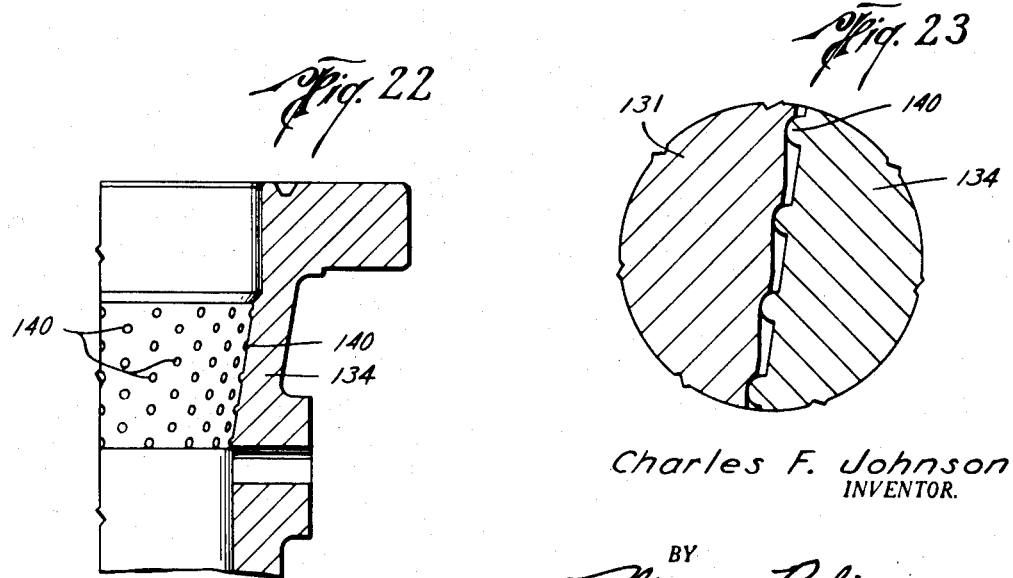
Fig. 22
Fig. 23
Charles F. Johnson
INVENTOR.
BY Murray Robinson
ATTORNEY July 2, 1963

C. F. JOHNSON 3,095,627

PIPE ANCHOR

Original Filed May 14, 1954

Charles F. Johnson
INVENTOR.

BY Murray Robinson
ATTORNEY

July 2, 1963 C. F. JOHNSON 3,095,627
PIPE ANCHOR
Original Filed May 14, 1954 11 Sheets-Sheet 11

Charles F. Johnson
INVENTOR.

BY Murray Robinson
ATTORNEY

United States Patent Office 3,095,627
Patented July 2, 1963

3,095,627
PIPE ANCHOR
Charles F. Johnson, Houston, Tex., assignor to McEvoy Company, Houston, Tex., a corporation of Texas
Original application May 14, 1954, Ser. No. 429,870. Divided and application June 6, 1958, Ser. No. 740,228. Divided and application Feb. 9, 1960, Ser. No. 7,673, now Patent No. 2,887,754, dated May 26, 1959. Again divided and this application July 7, 1960, Ser. No. 41,447
11 Claims. (Cl. 24—263)

This invention pertains to wells and more particularly to anchoring devices used therein, e.g. devices for suspending casing from a well head, devices for holding a packer in position in a casing, devices for connecting a fishing tool to a fish as in spears and overshots.

More specifically, the invention pertains to anchoring devices of the type utilizing slips for engaging a pipe and transferring load between the pipe and the support for the slips.

A slip is a wedge having a pipe engaging or front face which is a generally cylindrical surface with means such as sharp circumferentially extending teeth thereon to engage a pipe by indentation of the surface thereof sufficient to prevent relative axial motion of the pipe and slip, the back face of the wedge, which faces away from the pipe being tapered, that is, having a surface which is at an angle to the axis of the cylindrical front face. Usually the back face of the slip is conical with the cone axis concentric with the axis of the cylindrical front face. Slips are also known in well apparatus having plane back faces; however, where a plurality of slips are used disposed around the outside or the inside of the pipe to be engaged as shown in the embodiments of the invention hereinafter illustrated, as a practical matter having reference to the maximum utilization of the available space, the back faces of the slips will have generally conical surfaces. According to whether the slips are to engage the interior or exterior of the pipe, the cylindrical front faces thereof will be convex or concave and the conical back faces thereof will be concave or convex, just the opposite from the front faces.

Usually a slip is an integral construction. However, composite slips are also known, as shown for example in United States Patent Number 2,061,771 issued April 4, 1936, to George T. McLagan. Therefore a slip may be considered to be a combination of pipe engaging means, support engaging means, and means for transferring load between the pipe engaging means and the support engaging means.

Also, slips are usually arcute segments of one hundred twenty degrees or less and used in sets circumferentially disposed around the pipe to be engaged, with spaces between the sides of the slips to permit them to move radially in and out. However, slips are also known of greater than 360 degrees extent such as shown for example in United States Patent Number 2,670,797 issued March 2, 1954, to A. L. Armentrout.

Difficulty has been experienced with slip suspension of well casing when the casing is of great weight, as in very deep wells, the difficulty being a tendency of the casing to collapse or "bottle neck." Similar troubles may be encountered in the use of overshot fishing tools if great forces are required to free the fish. The reverse type of problem may be encountered with spears and packers where excessive axial loading may cause bursting of the fish or casing as the case may be.

The most important application of the invention is in slip suspension of casing in a casing head and this example will be discussed in the following, bearing in mind that the theory is of general application. In this illustrative case it is desired to reduce the final radial unit pressure of the slips on the casing for any given weight of casing so that the reduction in casing diameter will not exceed the maximum permissible value for the maximum weight of casing that can be hung in the well.

The terminology "final radial unit pressure" is used because the hanging of casing by means of slips is not an instantaneous process but occupies a brief period of time and initially the only radial force acting on the pipe is that due to the weight of the slips and the friction between the casing and slips as the casing is lowered. It is only after the pipe gripping teeth (wickers) on the front faces of the slips have sufficiently indented the pipe to hold it against relative motion that the full final radial force of the slips on the pipe is exerted.

The maximum permissible reduction of casing diameter may be determined by the necessary clearance for passage of full gage tools therethrough as is necessary for performing operations inside the casing after it is hung. Another determining factor is that the reduction in diameter must not be such as to correspond to stresses exceeding the yield point wherein further plastic deformation occurs without increased loading resulting usually in the casing pulling apart. Which of these two factors is controlling will depend on the strength and thickness of the casing wall.

The maximum weight of casing that can be hung in a well is to be judged by the strength of the coupling joints. It is desirable that the slip suspension be such as to permit a weight of casing to be hung equal to the coupling strength without exceeding the maximum permissible reduction in casing diameter.

Two possible ways of reducing the final radial unit pressure of the slips on the casing are increase of area of contact of slips and pipe to better distribute the load and reduction of the total radial component of the slip force against the pipe. When either of these methods is tried, difficulties are encountered as will be explained.

The radial component of the slip force on the pipe is equal and opposite to the radial component of the pipe reaction on the slips. A consideration of the forces in equilibrium acting on a slip as a free body will therefore be helpful in investigating the problem. The forces acting on a slip supporting a casing from a casing head consist of the weight of the slip, the reaction of the pipe, and the reaction of the supporting bowl in the casing head; the slip transferring load from the pipe to the bowl. After the casing has been hung the weight of the slips is negligible compared to the other forces involved, so that there must be equilibrium established between the pipe reaction and the bowl reaction. Since the radial component of the pipe reaction must be equal and opposite to the bowl reaction, we can turn our attention to the latter.

There being sliding contact between the back of the slip and the bowl, the bowl reaction may be resolved into two components, one normal to the bowl and a friction component parallel to an element of the surface of the bowl. Therefore the radial component of the bowl reaction will be reduced as the taper angle of the bowl increases and as the friction angle of the bowl increases, the latter angle being the angle whose tangent is the coefficient of friction between slip and bowl.

It has been determined mathematically that the answer to the foregoing problems does not lie in increased taper on the backs of the slips, for this reduces the length of the slips and causes corresponding increased unit stress on the pipe contacted by the front of the slips. In this connection it is to be noted that in wells the radial distances are fixed which is the reason increased taper means shorter slips. Likewise, increased length of slips with more gradual taper is not the answer because the radial forces tend towards infinity as the taper approaches zero, so that although contact area between slips and pipe is increased with longer slips, the unit stress remains the same or increases. Again it is to be observed that in a well where radial distances are fixed, increased length requires less taper on the slips.

One solution of the problem has been the use of step backed slips in order to overcome the limiting factor of radial distance in the well. With such slips greater length can be achieved without reduction of taper. This solution of the problem presents manufacturing difficulties because of the necessity of aligning the successive steps on the slip backs so as to make them all seat at once. The close tolerances required cause the cost to be high. Furthermore, if, through manufacturing error, tolerances are not maintained, all of the tapered portions on the backs of the slips will not seat simultaneously resulting in a slip of short effective length which will cause the pipe to be collapsed or burst as the case may be. This solution of the problem may therefore be considered to be unreliable.

Another solution that has been proposed is to increase the coefficient of friction between the backs of the slips and the surface of the bowl of the casing head by rough machining the bowl. However, this solution has been a failure because it prevents the slips from gripping the pipe enough to hold the pipe from moving. To fully understand the reason for this requires a consideration of the transient conditions occurring during the setting of the slips.

The back of a slip is adapted to engage a support which is either at a fixed radial distance from the surface of the pipe to be engaged by the front of the slip or at most has but a limited amount of possible motion relative thereto so that upon axial motion of the slip relative to the support in the direction the slip tapers down the consequent radial motion of the slip toward the pipe will ultimately cause the teeth or other means on the front face of the slip to indent the pipe and prevent relative axial motion of the pipe and slip.

In the cases of the suspension of casing in a well head or the engagement of an overshot fishing tool with a pipe, there are usually only two forces available for causing slip motion relative to the support:

(1) Weight of the slip;
(2) Friction between the slip and pipe as they move axially relative to each other prior to the front face of the slip indenting the pipe.

In the case of packers and spears there usually is added to these the force of friction between the pipe and spring loaded drag blocks or wiper springs, which in the following will be considered as part of the weight of the slips. The above mentioned two forces act axially and their components normal and parallel to the support surface vary as the taper of the bowl. The greater the taper angle the larger the normal force and the less the parallel force. Any frictional or analogous force resisting relative motion between the slip and support parallel to the support surface must be overcome by the component of the above enumerated forces tending to move the slip parallel to the support surface. If the latter is insufficient the slip will not move relative to the support and hence will not move in radially to indent the pipe and the slip will be inoperative.

The frictional resistance to relative motion of the slip and support depends on the normal force holding them in engagement. As previously stated, this normal force is initially a component of the weight and pipe friction forces acting on the slip and increases as the taper angle of the support increases. Therefore, increasing the bowl taper angle both lowers the parallel component of these forces and increases the normal component, both changes reducing the net force tending to move the slip.

The frictional resistance of slip motion also increases with increase of the coefficient of friction for the engaged surfaces of slip and support.

As the slip moves relative to the support the radial motion of the slip relative to the pipe causes the pipe to begin to indent and a radial force due to the reaction of the pipe on the slip is added to the previous friction force due to their relative motion. This increases the toal frictional resistance to motion of the slip relative to the support. If the force of frictional resistance due to relative motion of the slip and pipe does not increase as fast or faster due to the indentation of the pipe than the frictional resistance to motion of the slip relative to the support, the latter will soon prevail and the slip will stop moving relative to the support and hence will stop indenting the pipe and the pipe will not be gripped by the slip enough to prevent relative motion of pipe and slip.

With a rough machined bowl, the coefficient of friction is so large that either the initial resistance to slip motion is sufficient to hold the slips stationary despite the force of the slip weight and pipe friction or else the force of resistance to slip motion increases faster than the force between pipe and slip and predominates before the pipe has been indented sufficiently to be held against motion. In this latter case the slip merely removes a layer of scale and metal from the pipe as it slides through.

It is the object of this invention to provide a device for anchoring to pipe that will overcome the difficulties previously outlined of pipe bottle-necking collapse or bursting, which will be reliable and simple to operate, and which will be inexpensive and easy to manufacture.

According to the invention friction control means is provided between the back faces of the slips and the surface of the slip bowl to cause the coefficient of friction to be initially low enough to cause the slips to set, that is, indent and hold the pipe against relative motion, and thereafter to increase to such a value that the downward and hence inward motion of the slips is insufficient to cause reduction of casing diameter beyond the permissible amount even when the maximum weight of casing is hung on the slips.

Other objects and advantages of the invention will become apparent from the following description of a preferred embodiment thereof, reference being had to the accompanying drawings wherein:

FIGURES 2A and 2B are enlarged sectional views showing portions of the casing suspension illustrated in FIGURE 1, and illustrating the slips thereof in unset and set positions respectively;

FIGURES 3 and 4 are sectional views on a still larger scale showing portions of the casing suspension in unset and set positions respectively;

Figure 1:
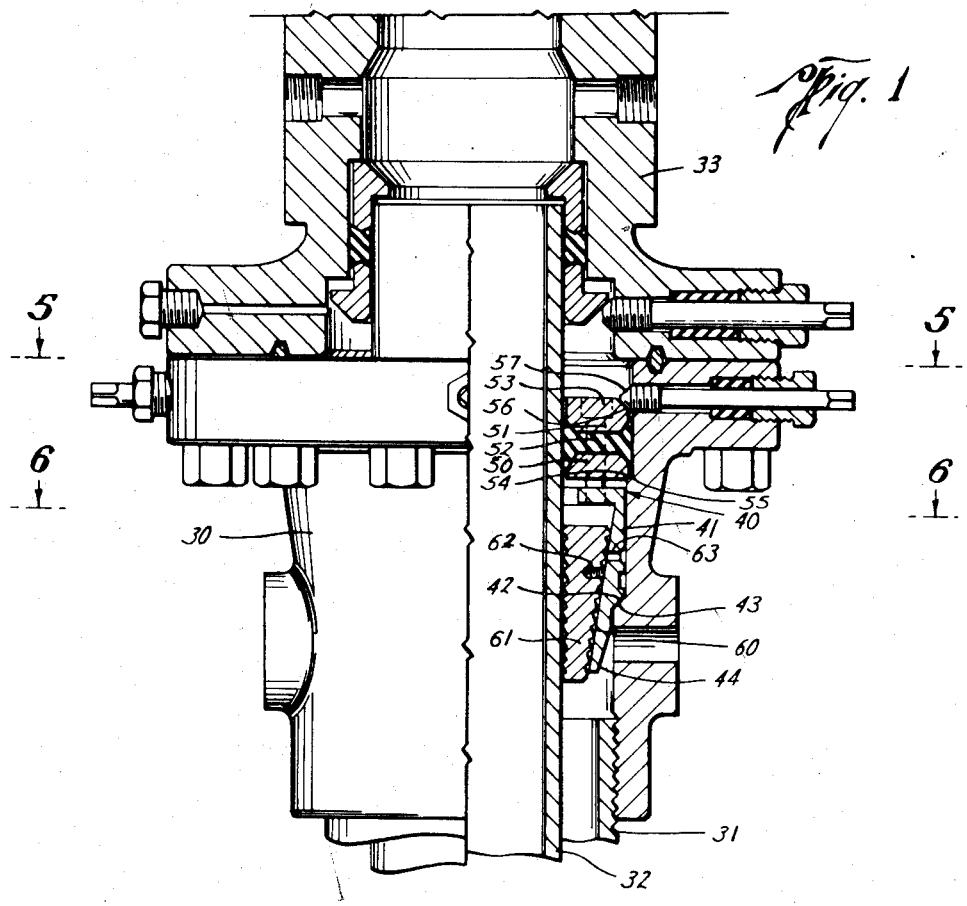
FIGURE 1 is an elevation partly in section, of a well head incorporating a casing suspension embodying the invention.
Figure 9:
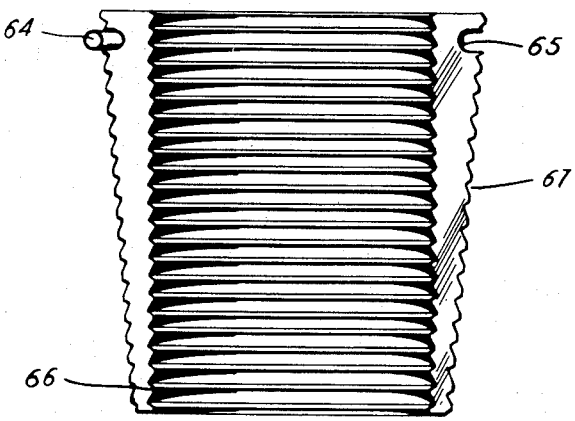
Figure 10:
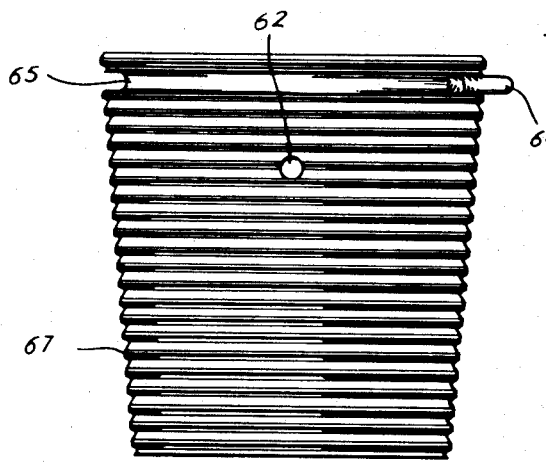

FIGURES 5 and 6 are horizontal sections taken along lines 5—5 and 6—6 of FIGURE 1;

FIGURE 7 is an elevation showing a casing hanger of the type illustrated in FIGURE 1;

FIGURE 8 is a top view of the casing hanger shown in FIGURE 7 and showing a set of slips disposed therein;

FIGURES 9 and 10 are front and back views of one slip of a set of slips embodying the invention, of the type shown in FIGURE 1.

Figure 24:
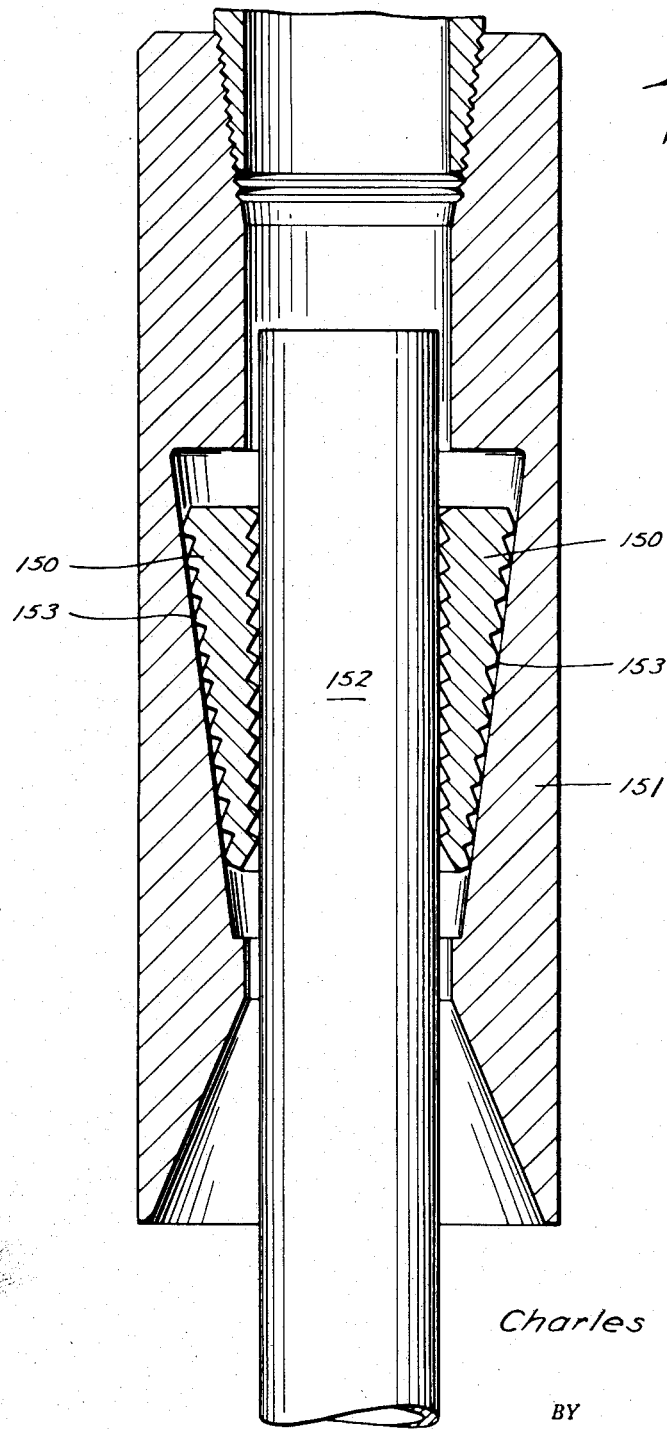
Figure 25:
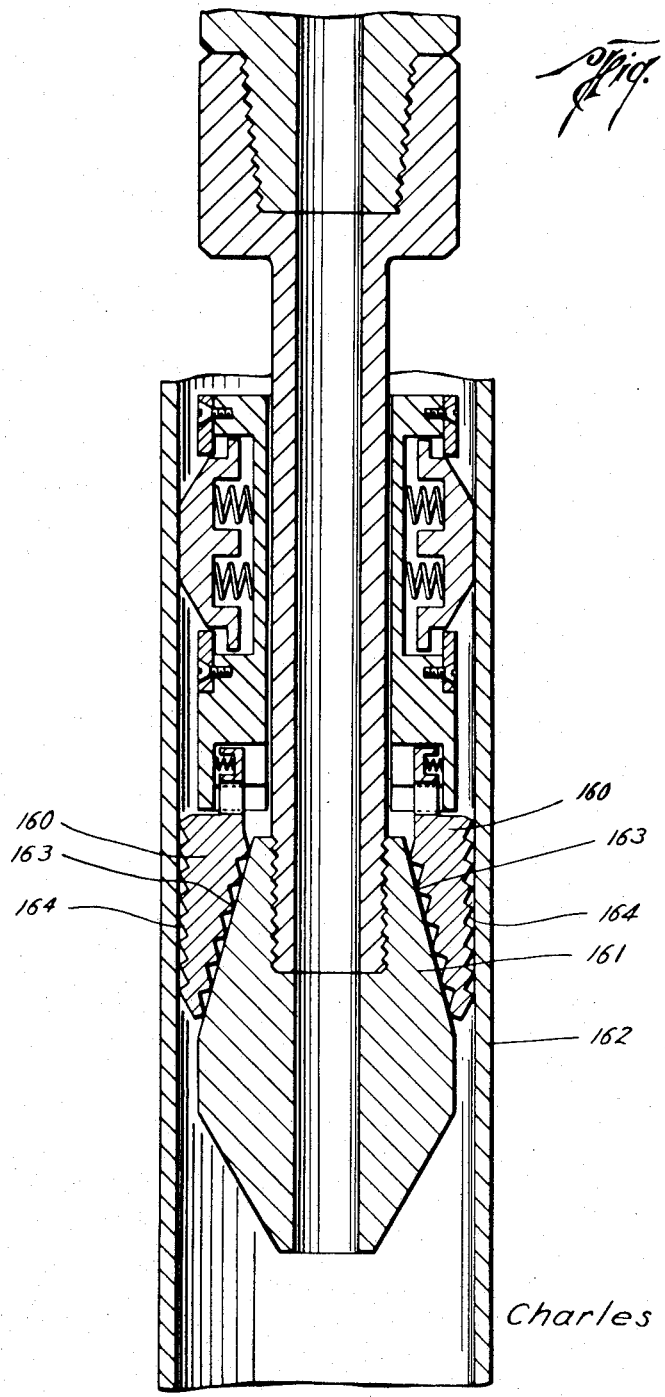

FIGURE 11 is an enlarged fragmentary detail in vertical section through a slip and hanger showing a modification;

FIGURE 12 is a further enlargement of a portion of the detail shown in FIGURE 11;

FIGURE 13 is a view similar to FIGURE 11 showing a further modification;

FIGURE 14 is an enlargement of a portion of FIGURE 13;

FIGURES 15 and 16 are views similar to FIGURE 14 showing two further modifications;

FIGURE 17 is a view similar to FIGURES 11 and 13 showing a further modification;

FIGURE 18 is an enlargement of a portion of FIGURE 17;

FIGURES 19 and 20 are views similar to FIGURE 18 showing two further modifications;

FIGURE 21 is an elevation partly in vertical section, showing a well head embodying a modified form of the invention;

FIGURE 22 is a detail showing a portion of the well head shown in FIGURE 21;

FIGURE 23 is an enlarged vertical sectional view showing a portion of the apparatus shown in FIGURE 21;

FIGURE 24 is a vertical section showing an overshot embodying the invention;

FIGURE 25 is a vertical section showing a spear embodying the invention; and

Figure 26:
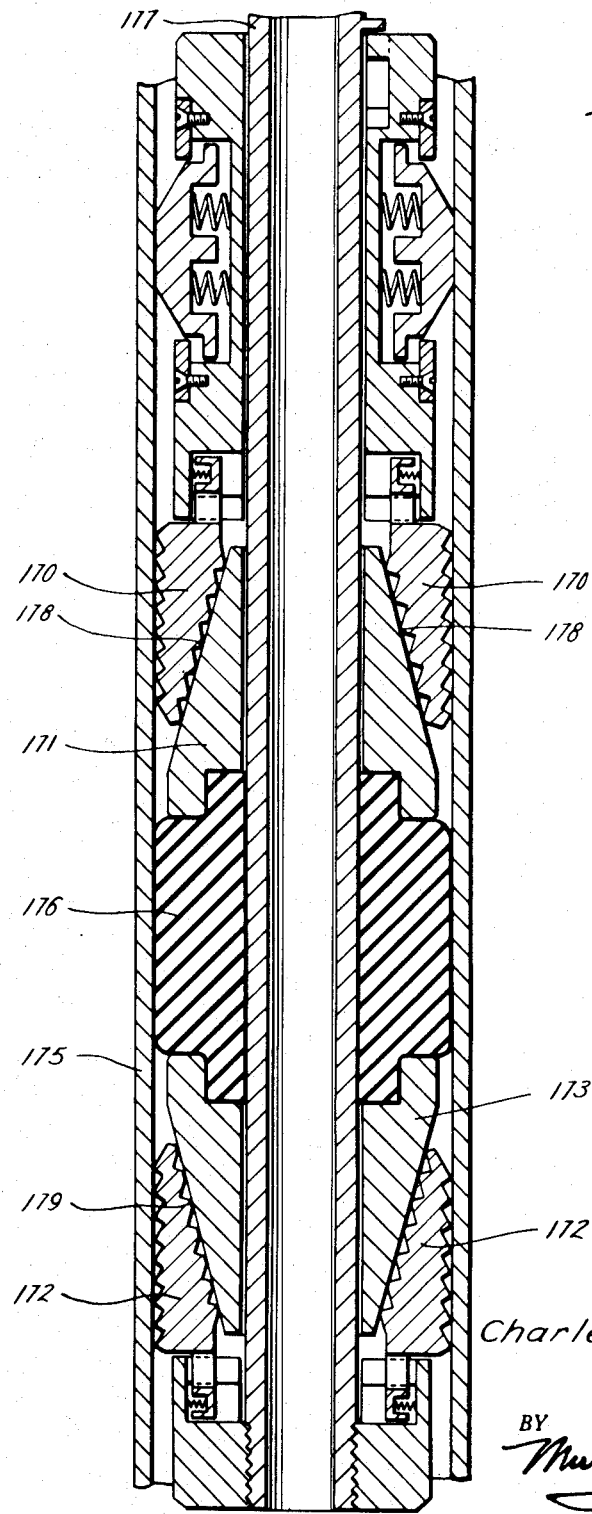

FIGURE 26 is a vertical section showing a permanent type packer embodying the invention.

Referring first to FIGURE 1 there is shown a casing head 30 secured to the upper end of a string of casing 31. Supported by and sealed to the casing head is the upper end of another string of casing 32 disposed inside the casing head and extending thereabove into the lower portion of tubing head 33. Casing 32 is also sealed to the tubing head.

Referring now also to FIGURE 7, the means for sealing between the casing head 30 and casing 32 includes a casing hanger 40 which comprises a hollow bowl 41 of generally circular cross section having upper and lower outer cylindrical portions separated by a conical shoulder 42 adapted to seat on a similar conical shoulder 43 inside the casing head. The lower end of the bowl 41 is conical on its exterior as shown at 44 to guide the bowl into place when it is lowered into the head.

As best shown in FIGURE 8, the bowl is preferably made in two halves which are pivotally connected together at one side by a spring steel double pintle hinge 45 whose pintles 46 are welded into recesses cut into the bowl above and below a channel 47, the channel being an easily machined space for the pintles and hinge to work in. At the opposite side from hinge 46 a spring steel latch 48 is pivotally and snap connected respectively to pins 49 mounted similarly to pins 46. A dowel pin 49' disposed in one half of the bowl adjacent latch 48 is adapted to enter a hole 50' in the other half of the bowl to help maintain alignment of the two halves of the bowl.

Referring again to FIGURES 1 and 7, and also to FIGURE 5, to the upper end of the bowl 41 is secured a means for sealing between the casing and casing head comprising a support ring 50, a compression ring 51 and a ring 52 of rubber-like sealing material such as neoprene disposed therebetween. The three rings of the sealing means are held together and to each other by means of a plurality of screws 53 screwed through the rings into the top of bowl 41. The rings are free to slide up and down on the screws 53. The support ring 50 has a bevel surface 54 around its lower outer periphery adapted to seat on a conical shoulder 55 inside the casing head 30. With the support ring thus seated, tension on screws 53 due to load on the bowl causes the compression ring to move down and expand the sealing material ring horizontally to seal between the casing and casing head. The compression ring 51 also has a bevel surface 56 around its upper outer periphery on which bear lock screws 57, by means of which the compression ring can be forced down or held down to make or maintain the seal and retain the hanger in the casing head.

As shown in FIGURES 5 and 7, rings 50 and 51 are each preferably made in two halves, and ring 52 is split adjacent one of the junctures of the two halves of rings 50 and 51. The part of ring 52 adjacent the other juncture of the two halves of rings 50 and 51 serves as a hinge. Since ring 52 is fairly stiff and tends to retain its circular shape no latch is needed for the part of the sealing means that opens up to receive the casing.

Referring now to FIGURES 1, 9, and 10, the interior of bowl 41 is provided with a recess having a conical surface 60 within which are disposed a plurality of slips 61. Each slip is provided with a tapped recess 62 which can be aligned with one of a plurality of holes 62 through the bowl 41, whereby a screw, not shown, can be passed through hole 63 into hole 62 to retain the slip in the bowl and hold it in elevated, i.e., retracted position as shown in FIGURE 2A. These screws are removed after the hanger is placed around the casing and before it is lowered into the casing head. The slips are maintained in vertical alignment by the engagement of a pin 64 welded to one side of each slip with a groove 65 in the adjacent slip.

The inner or front face of each slip is provided with a plurality of teeth 66 which are preferably upwardly pointing, that is, the medians or lines connecting the midpoints of the crests with the midpoints of the roots point outwardly up. The teeth preferably are of modified buttress thread cross-section. In fact each set of slips is conveniently formed from an integral sleeve which is turned with an internal buttress thread before it is cut into four segments to form the slips.

Figure 3:
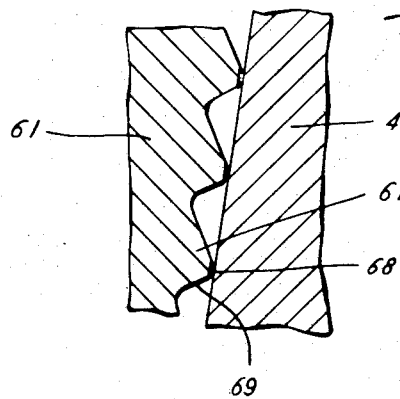

On the outside or back face of each slip there are formed a plurality of teeth 67. These are preferably downwardly pointing and also of modified buttress thread cross-section and having flat crests 68 as best shown in FIGURE 3. These teeth are also conveniently formed by cutting a helical thread on the exterior of a sleeve that is later cut into segments to form a set of slips. Although the teeth 67 are downwardly directed, they are what may be termed unloading teeth, in that the angles between the teeth flanks 69 on the lower sides of the teeth and the base material are obtuse angles. The teeth are also unloading with reference to their upper flanks 70. By making the active areas of the teeth unloading, that is, by making unloading the parts that engage the opposing metal of the hanger 41, there is no wedging action tending to make the teeth dig in farther when moved transversely, that is, parallel to the surface of the opposing metal. The combined area of the crests of teeth 67 is greater than the combined area of the crests of teeth 66.

Referring again to FIGURE 2A, in the unstressed condition the top of bowl 41 is in contact with support ring 50 and the distance between beveled surface 54 and shoulder 42 is less than the distance between shoulders 55 and 43. When the hanger is placed in the casing head it seats first on shoulder 55. Then, when the casing is lowered and the slips are pulled down in the bowl as shown in FIGURE 2B, the bowl seats on shoulder 43 and the screws 53 draw the compression ring 51 down to expand the seal ring radially against the casing head and the casing to seal therebetween. This mode of automatic sealing is disclosed and claimed in United States Patent No. 2,824,757 issued February 25, 1958. The seating of the bowl on shoulder 43 limits the degree of loading of the sealing means including the seal ring 52 and the tension screws 53.

Referring now to FIGURES 3 and 4, there is illustrated the action of the back teeth 67 on the backs of the slips 61. As shown in FIGURE 3, initially the flat crests 68 of the teeth slide down in the bowl 41 as load is applied by the front teeth of the slips gripping the casing. Then as the load increases, the stress at the area of contact between the crests 68 and the bowl 41 exceeds the yield point of the material of the bowl and the teeth 67 dig in as shown in FIGURE 4. The engagement of teeth 67 with the bowl 41 retards further downward movement of the slips compared to the movement that would take place if the backs of the slips were smooth and thereby prevents excessive radial inward motion of the slips under maximum casing weight permissible so that the casing will not be collapsed. The prevention of excessive deformation of the casing not only insures that the casing will not be parted and that full gage tools can be passed therethrough, but also insures that the seal between the casing and seal ring 52 will be maintained.

It is to be noted that slips are usually heat treated so as to make them hard and strong. This is to enable the front teeth 66 to bite into the casing. It is therefore no extra trouble to provide hardened back teeth 67 which are heat treated at the same time as the rest of the slip. Since teeth 67 are harder and stronger than the slip bowl, the yield point of the slip bowl is lower than that of the slip teeth and on increasing load the bowl yields while the teeth are still below their yield point and the teeth bite into the bowl.

Referring now to FIGURES 11 through 20 there are shown alternative constructions of the slips and bowl. In each of these cases the front face of each slip 100 is provided with preferably upwardly directed teeth 101 to engage casing 102 the same as in the FIGURES 1 and 4 embodiment. Also, the outside or back face of the bowl part 103 of each hanger is provided with a steeply tapered seat 104 like the shoulder 42 in the first described embodiment. Since these parts are the same in each case, they are given the same reference numbers. The back faces of the slips and/or the front faces of the bowls are modified as hereinafter described.

In FIGURES 11 and 12, the back faces 105 of each of the slips is a tapered surface of less taper than seat 104, the same as in the FIGURES 1 and 4 embodiment, but there are no teeth, the surface being smooth. Furthermore, the face 105 is of a hardness and strength more nearly equal to that of the front face 107 of the bowl than in the FIGURES 1 and 4 embodiment, preferably the hardness of the two faces being equal and less than that of teeth 101. This is accomplished by heat treating only the front or toothed face of each slip.

The face 107 of the bowl is of less vertical extent than the back of each slip; this being done to reduce the area of contact between the bowl and backs of the slips so as to provide high unit stress therebetween. The area of contact is larger, however, than that of teeth 101 with casing 102.

In operation, the teeth on the front faces of the slips first bite into the casing as load is applied, the back faces of the slips moving down on the bowl and radially inwardly. Then when the unit stress on the contacting surfaces of slips and bowl exceeds the yield points of the metal of slips and bowl, galling takes place followed by the production of a plurality of heat and pressure welds between slips and bowl as shown in FIGURE 12. This tends to prevent further downward movement of the slips and hence prevents further rapid radial inward motion thereof as the slips bring the casing to rest. By proper choice of materials and areas of contact of slips and bowl for any given casing, the slips can be made to stop their inward motion before bottle necking or crushing of the casing occurs.

In the embodiment shown in FIGURES 13 and 14, the slips are the same shape as in FIGURE 11, but the front face 107 of the bowl 103 is not of reduced vertical extent and is the same as in the FIGURES 1 and 4 embodiment. As best shown in FIGURE 14, granular particles 108 of a material harder than either the bowl or the back faces of the slips, e.g. tungsten carbide particles of average diameter of 1/32 inch are disposed between the slips and bowl. These are placed in a suitable vehicle such as paint or grease or other sticky viscous fluid and applied, e.g. by a brush, to either or both of the contacting surfaces of slips and bowl before assembly. Preferably this application should take place just before the hanger is set in the casing head on completion of the well to insure that none of the material is lost before use. The quantity of granular material used should be such that the area of contact of the particles with the slips or the bowl is greater than that of the teeth on the front faces of the slips with the casing.

In operation, as shown in FIGURE 14, the teeth on the front faces of the slips bite into the casing as load is applied causing downward and inward motion of the slips to cause them to dig deeper into the casing. Then as the unit stress on the bowl and the backs of the slips reaches the yield point, the adjacent surfaces of slips and bowl yield causing the granular particles to dig into both slips and bowl and bind them together to retard further downward motion of the slips as the slips bring the casing to rest until the slips finally stop as full load is reached. As in any slip suspension, stopping of downward motion also stops radial inward motion to stop further increase of radical stress on the pipe held by the slips but according to the invention this is achieved more rapidly as the slips take the casing load so as to prevent its collapse.

Referring now to FIGURES 15 and 16 there are shown two further modifications on the same general plan as the embodiment of FIGURES 13 and 14. In FIGURE 15 the granular particles 109 are permanently attached to the backs of slips 100, for example by sweating them on, either directly into the base metal or into a solder coating. Alternatively the granules could be permanently affixed to the inner face of the bowl. Instead of using irregular particles, regular particles such as ball bearings could be used as shown at 110 in FIGURE 16, placed at regular intervals in holes 111 in the backs of the slips and staked into position; alternatively, the smooth particles could be similarly secured to the bowl. The operation of these embodiments is substantially the same as that of the embodiments previously described.

Referring now to FIGURES 17 through 20 there are shown embodiments of the invention in which both the front face of the bowl and back faces of the slips are other than smooth. In FIGURES 17 and 18, these surfaces are provided with teeth having very wide gently sloping tooth flanks. In operation these teeth slip past one another as load is first applied to the slips, with increasing depths of tooth crest sheared off until finally the width of the interengaging tooth crests is sufficient to hold the load. The slip teeth then hang on the bowl teeth and prevent further rapid downward motion of the slips and thus further radially inward motion stops before there is collapse or excessive deformation of the casing.

FIGURES 19 and 20 illustrate other tooth forms which can be used in place of the form shown in FIGURES 17 and 18. In FIGURE 19 the teeth have convex flanks and rounded crests. In FIGURE 20 the teeth have concave flanks and sharp crests. The operation of the embodiments shown in FIGURES 19 and 20 is similar to that of FIGURES 17 and 18. Preferably the metals used for the back surfaces of the slips and the front face of the bowl in embodiments of FIGURES 17 through 20 will be of equal or substantially equal hardness and strength and of less hardness and strength than that of the teeth on the front faces of the slips. This may be accomplished by heat treating the front or toothed face of each slip.

Referring now to FIGURES 21–23, there is shown a further embodiment of the invention in which the casing 130 is supported on slips 131 whose back faces 132 seat directly in conical bowl 133 in the casing head 134. The usual seal between the casing and casing head above the slips is shown at 135 between supporting ring 136 and compression ring 137.

As best shown in FIGURE 22, the conical bowl of casing head 134 has a plurality of dome shaped protuberances 140 formed thereon at preferably regular intervals. These may be formed by adding material to the bowl with an arc welding rod. The welded on material will be harder than the bowl and the backs of the slips.

The operation of the embodiment of the invention shown in FIGURES 21–23 is similar to that of the previously described embodiments. The preferably upwardly facing teeth 141 on the front faces of the slips grip the casing as the casing is lowered and the slips move downwardly and inwardly on the bowl 133. Then when the unit stress between protuberances 140 and the back surfaces of the slips exceeds the yield point of the slips, the protuberances dig into the slips and retard further downward motion thereof, thus reducing the total inward motion of the slips under full load and preventing excessive load from being applied to the casing that might collapse it or cause it to bottle neck.

In this embodiment of the invention the slips should be hardened only on their front faces, leaving the backs of the slips soft enough for the weld metal to dig into the slips. However if it is desired to heat treat and harden the slips all over, the protuberances could be applied to the backs of the slips instead of the face of the bowl, in which case the arrangement would be very nearly the same as in FIGURES 1 and 4 except for the absence of a hanger. It will be understood that the hanger may be eliminated or used with any of the various embodiments of the invention heretofore described, the principal features of the several embodiments being the nature of the contacting surfaces of the backs of the slips and the face of the bowl, whether the bowl is integral with the casing head or is in a separate hanger. However certain embodiments of the invention as respects the contact surfaces of the slips and bowl are better suited for use with a bowl and others without, and they have been shown in each case in the preferred combination.

In reviewing the foregoing embodiments of the invention it will be noted that in all cases means is provided between the backs of the slips and the bowl to control the "coefficient of friction" or perhaps more accurately the "coefficient of sliding resistance" or ratio of the force required to cause sliding of the slips on the bowl to the normal force between them, that is, the force perpendicular to their contacting surfaces. The ratio is controlled so as to increase rapidly whenever the normal force reaches a predetermnied critical value. In this way the total sliding of the slips relative to the bowl is reduced, thereby reducing the radially inward motion of the slips to prevent collapse of the pipe held by the slips. In all cases the critical loading of the slips at which the coefficient of friction increases would not only be less than that which corresponds to excessive pipe deformation but should be greater than the loading needed to make the slips grip the pipe firmly.

The foregoing embodiments of the invention show its application to the suspension of casing in a casing head. It is to be understood however that this invention is of wider applicability and is useful whenever a pipe is to be gripped by wedges and it is desired to limit the stress on the pipe. The invention can be used to suspend tubing as well as casing. Although the gripping of the backs of the slips to the bowl renders the invention of less utility where the suspension is not permanent, e.g. in the case of drill pipe suspended in a rotary table, there may nevertheless be some instances where use of the invention in nonpermanent suspensions will be very useful. For example, FIGURE 24 shows an overshot used in fishing operations. The tools there shown are conventional except for the contacting surfaces of the slips 150 and bowl 151 which may be formed to provide a variable "coefficient of sliding resistance" according to any of the methods previously described so as to prevent collapse of the fish 152. As illustrated, slips 150 are provided with flat crested teeth 153 as in the FIGURE 1 embodiment.

Not only is the invention useful to prevent collapse of pipe but it can be used to prevent its bursting as in the case of the fish spear shown in FIGURE 25. The spear is conventional except for the contacting surfaces of the slips 160 and expander 161 which are formed to provide a "coefficient of sliding resistance" increasing sharply before the load reaches such a value as to cause bursting of pipe 162. Again, any of the methods previously described or other similar method can be used to control the "friction." As shown, flat crested teeth 163 are provided on the back or inner faces of the slips, the teeth 164 on the front or outer faces of the slips being conventional, e.g., upwardly pointing. It will be noted that whether the slips move radially in or out under load, it is the vertical cylindrical face which has the ordinary teeth and the inclined or conical face at which the variable coefficient of friction is provided. The vertical face, exposed to grip the load, is called the front face; the inclined face, lying against the bowl or expander or other support, is called the back face.

FIGURE 26 shows an embodiment of the invention in a permanent type production packer which is conventional except for the areas of contact between the holddown slips 170 and upper expander 171, and between hold up slips 172 and lower expander 173 which are provided with means to control the "friction" according to any of the methods previously described or similar methods, so as to prevent bursting of casing 175 when packer 176 is expanded by pulling up on tubing 177. As shown, the slips are provided with flat crested back teeth 178, 179 as in FIGURE 1.

Plain hold up or hold down releaseable packers for production and cement retaining and other applications can also be made embodying the invention in a manner similar to that illustrated in FIGURE 26 for a permanent (nonreleaseable) type packer.

While preferred embodiments of the invention have been shown and described, many modifications thereof can be made by one skilled in the art without departing from the spirit of the invention and it is intended to protect by Letters Patent all forms of the invention falling within the scope of the following claim.

What is claimed is:

1. A pipe anchoring device comprising support means, segmented means disposed symmetrically around said support means, pipe gripping means on said segmented means coaxial with the axis of symmetry of said segmented means and facing away from said support means, and pipe actuated means actuated by the pipe moving in contact with the pipe gripping means axially in one direction relative to said support means to move said segmented means radially toward the pipe, said pipe actuated means including smooth axially continuous surface areas on one of the two first said means disposed around said axis and equally flaring therefrom in a direction opposite to said one direction and facing the other of the two first said means, said pipe actuating means further including indenting means harder than said smooth surface areas and disposed around the axis of said other of the two first said means and with a plurality of said indenting means in engagement with said smooth surface areas to gall said smooth surface areas when the normal force therebetween exceeds a certain value greater than that existing when said pipe gripping means engages the pipe sufficiently to prevent relative motion of the pipe and pipe gripping means and less than a predetermined value corresponding to excessive radial deformation of the pipe, said indenting means having portions facing said one direction to hang on said surface areas when galled and resist motion of said segmented means relative to said support means in said one direction, said indenting means having portions dull compared to said pipe gripping means facing said smooth surface areas for movement relative thereto without galling when said normal force is less than said predetermined value, said indenting means comprising granular particles.

2. The combination of claim 1 in which said indenting means comprises granular particles initially free to move relative to said segmented means and support means.

3. The combination of claim 1 in which said indenting means comprises granular particles embedded in said other of the two first said means.

4. The combination of claim 1 wherein the granular particles of said indenting means are made of tungsten carbide.

5. A pipe anchoring device comprising support means, segmented means disposed symmetrically around said support means, pipe gripping means on said segmented means coaxial with the axis of symmetry of said segmented means and facing away from said support means, and pipe actuated means actuated by the pipe moving in contact with the pipe gripping means axially in one direction relative to said support means to move said segmented means radially toward the pipe, said pipe actuated means including smooth axially continuous surface areas on one of the two first said means disposed around said axis and equally flaring therefrom in a direction opposite to said one direction and facing the other of the two first said means, said pipe actuated means further including indenting means harder than said smooth surface areas and disposed around the axis of said other of the two first said means and embedded therein and with a plurality of said indenting means in engagement with said smooth surface areas to gall said smooth surface areas when the normal force therebetween exceeds a certain value greater than that existing when said pipe gripping means engages the pipe sufficiently to prevent relative motion of the pipe and pipe gripping means and less than a predetermined value corresponding to excessive radial deformation of the pipe, said indenting means comprising spaced irregular particles harder than said smooth surface areas and having portions facing said one direction to hang on said surface areas when galled and resist motion of said segmented means relative to said support means in said one direction, said particles having portions dull compared to said pipe gripping means facing said smooth surface areas for movement relative thereto without galling when said normal force is less than said predetermined value.

6. The combination of claim 5 wherein the irregular particles of said indenting means are made of tungsten carbide.

7. A pipe anchoring device comprising support means, segmented means disposed symmetrically around said support means, pipe gripping means on said segmented means including sharp portions substantially coaxial with the axis of symmetry of said segmented means and facing away from said support means, and pipe actuated means actuated by the pipe moving in contact with the pipe gripping means axially in one direction relative to said support means to move said segmented means radially toward the pipe, said pipe actuated means including facing smooth axially continuous surface areas on each of the two first said means disposed around said axis and equally flaring therefrom in a direction opposite to said one direction, said pipe actuated means further including indenting means comprising loosely disposed irregular particles harder than said smooth surface areas disposed between said smooth surface areas of the two first said means and engaging therebetween to gall said smooth surface areas when the normal force therebetween exceeds a certain value greater than that existing when said pipe gripping means engages the pipe sufficiently to prevent relative motion of the pipe and pipe gripping means and less than a predetermined value corresponding to excessive radial deformation of the pipe, said particles having portions facing said one direction to hang on said surface areas when galled and resist motion of said segmented means relative to said support means in said one direction, said particles having portions dull compared with said pipe gripping means facing said smooth surface areas for relative movement between said smooth surface areas without galling thereof when said normal force is less than said predetermined value.

8. The combination of claim 7 wherein the irregular particles of said indenting means are made of tungsten carbide.

9. A slip having a generally segmental cylindrical face with sharp teeth on said cylindrical face and having an opposite face tapering relative to the axis of said cylindrical face, said tapering face having particles of irregular size and surface configuration secured on said tapering face in abutting surface contact with the outer surface thereof with said particles being harder than the base material of said slip.

10. Annular segmented pipe anchoring wedge means having an axial pipe receiving passage therethrough, said wedge means comprising means including sharp teeth disposed in said passage presenting a generally cylindrical pipe gripping surface, and means including particles of irregular size and surface configuration secured on the exterior of said wedge means in abutting surface contact therewith and presenting a generally conical wedging surface.

11. A unitary construction slip including a generally segmental cylindrical face with sharp teeth on said cylindrical face and having an opposite face tapering relative to the axis of said cylindrical face, said tapering face having particles of irregular size and surface configuration secured on said tapering face in abutting surface contact with the outer surface thereof.

References Cited in the file of this patent

UNITED STATES PATENTS

| | | |
|---|---|---|
| 1,852,695 | Carroll | Apr. 5, 1932 |
| 2,086,652 | Volpin | July 13, 1937 |
| 2,312,487 | Roach et al. | Mar. 2, 1943 |
| 2,490,512 | Deely | Dec. 6, 1949 |
| 2,576,528 | Matthysse | Nov. 27, 1951 |
| 2,683,045 | Brooks | July 6, 1954 |
| 2,824,757 | Rhodes | Feb. 25, 1958 |

FOREIGN PATENTS

| | | |
|---|---|---|
| 41,478 | Switzerland | Aug. 8, 1907 |